US00RE37626E

(19) United States
(12) Reissued Patent
Monahan

(10) Patent Number: US RE37,626 E
(45) Date of Reissued Patent: Apr. 9, 2002

(54) BROOM AND METHOD OF MAKING A BROOM

(76) Inventor: Jon Monahan, 202 N. Oak, Arcola, IL (US) 61910

(21) Appl. No.: 09/496,860

(22) Filed: Feb. 2, 2000

Related U.S. Patent Documents

Reissue of:
(64) Patent No.: 5,907,884
Issued: Jun. 1, 1999
Appl. No.: 09/144,894
Filed: Sep. 1, 1998

U.S. Applications:

(62) Division of application No. 08/856,962, filed on May 15, 1997, now Pat. No. 5,865,509, which is a continuation-in-part of application No. 08/651,844, filed on May 21, 1996, now Pat. No. 5,836,037, and application No. 08/605,876, filed on Feb. 23, 1996.

(51) Int. Cl.[7] ..... A46B 3/08; A46B 3/16
(52) U.S. Cl. ..... 15/189; 15/159.1
(58) Field of Search ..... 15/143.1, 145, 15/159.1, 171, 176.1, 176.2, 189, 228, 229.1, 229.2, 229.6; 300/14, 15, 21

(56) References Cited

U.S. PATENT DOCUMENTS

| | | | | | |
|---|---|---|---|---|---|
| 91,907 | A | * | 6/1869 | Burnett | 15/189 |
| 1,170,040 | A | * | 2/1916 | Boeckh | 15/189 |
| 4,541,139 | A | * | 9/1985 | Jones et al. | 15/171 |
| 4,642,837 | A | * | 2/1987 | Nichols et al. | 15/171 |
| 5,161,278 | A | * | 11/1992 | Tomm | 15/159.1 |
| 5,385,420 | A | * | 1/1995 | Newman et al. | 15/145 |
| 5,920,945 | A | * | 7/1999 | Libman | 15/189 |
| 5,954,064 | A | * | 9/1999 | Motherhead | 15/145 |
| 6,049,937 | A | * | 4/2000 | Jacobs | 15/171 |

* cited by examiner

*Primary Examiner*—Terrence R. Till
(74) *Attorney, Agent, or Firm*—R. William Graham

(57) ABSTRACT

A broom having a handle with a threaded end and a broom head connected to the handle which includes a generally cylindrical sleeve made of plastic having a first end which defines an open surface extending axially therethrough and a second end which defines a forward threaded open surface partially extending axially through the second end in communication with the open surface of the first end and further defines an open keyed surface of a predetermined configuration axially extending from the forward threaded open surface through a remainder of the second end, wherein the open surfaces of the first end and forward threaded open surface are configured to receive the threaded end of the handle and wherein the sleeve is employed in a method for winding a broom head which includes mating the sleeve to a shaft having a portion of an outer diameter of a size to be received within the open surface of the first end and a keyed end portion of an outer configuration to be complimentary received within the keyed surface, disposing broom corn or grass about the sleeve, securing an end from a winding wire through the broom corn to the sleeve, rotating the shaft such that the winding wire wraps about the broom corn in a manner to secure the broom corn to the sleeve and connecting another end of the wire to the sleeve.

22 Claims, 5 Drawing Sheets

Fig. 8
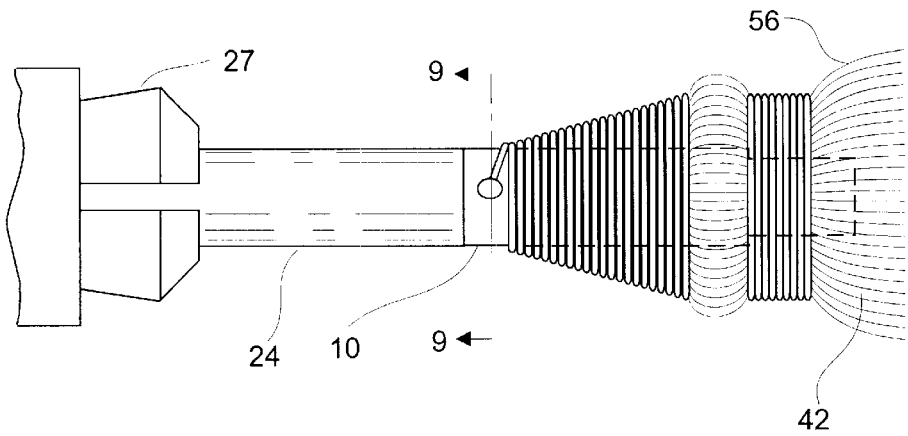
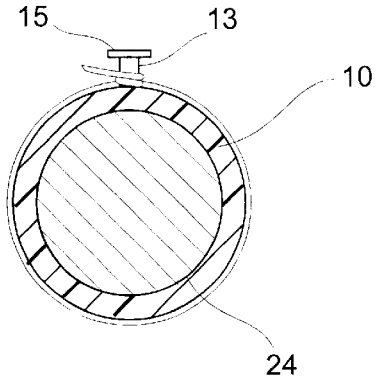
Fig. 9
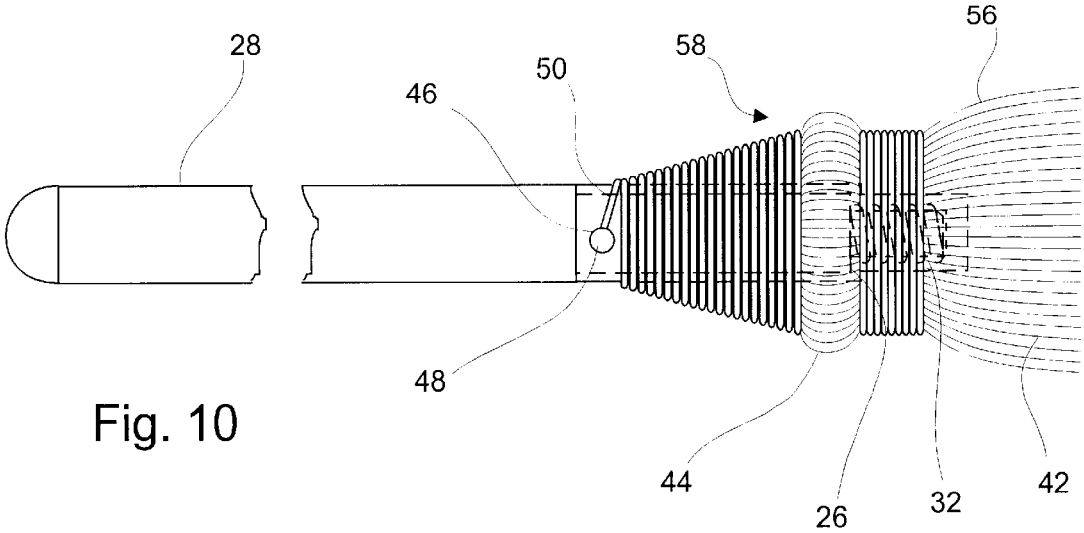
Fig. 10

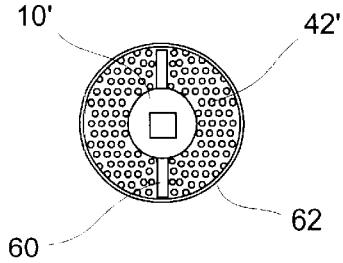
Fig. 14
Fig. 15
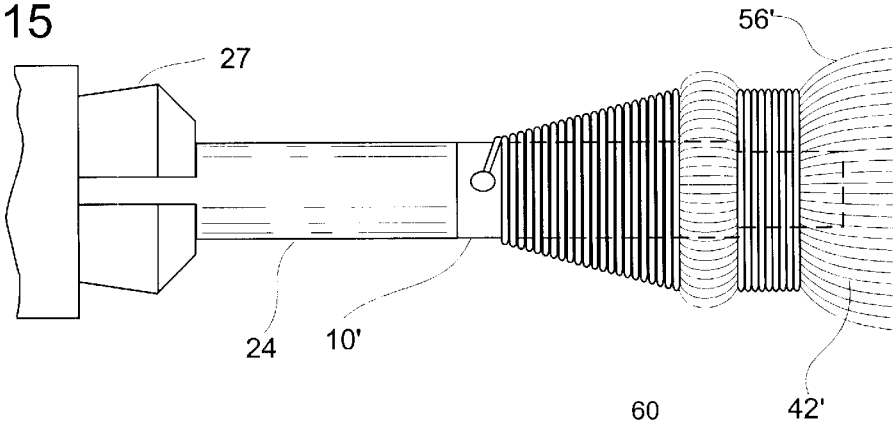
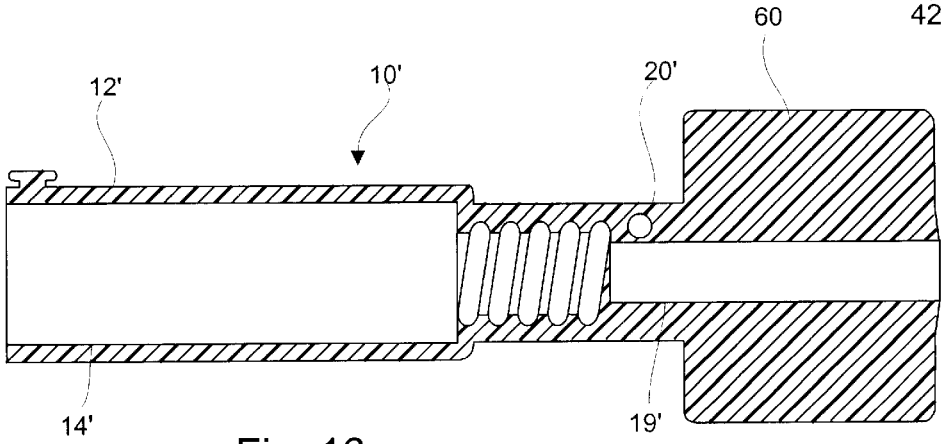
Fig. 16
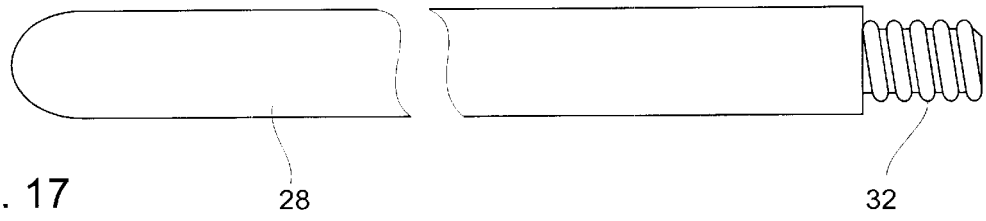
Fig. 17

BROOM AND METHOD OF MAKING A BROOM

Matter enclosed in heavy brackets [ ] appears in the original patent but forms no part of this reissue specification; matter printed in italics indicates the additions made by reissue.

This is a divisional case of U.S. Ser. No. 08/856,962 filed May 15, 1997 now U.S. Pat. No. 5,865,509, which is a continuation in part of U.S. Ser. No. 08/651,844 filed May 21, 1996 now U.S. Pat. No. 5,836,037, and U.S. Ser. No. 08/605,876 filed Feb. 23, 1996.

BACKGROUND OF THE INVENTION

1. Field of the Invention

The present invention relates to improvements in brooms wherein the broom head is made separate from the handle. More particularly, the invention relates to a novel broom having a broom head which includes a broom head sleeve and method of making a broom using the same.

2. Related Art

The art of broom making is very extensive including myriads of designs for various purposes. Brooms commonly include a handle and broom head which has a plurality of debris gathering fibers. The fibers are arranged in rows in a side by side lengthwise manner and are bound together and attached to the handle directly or to a head which is then attached to the handle.

To save in costs of packaging, shipping and shelf storage space, various designs for separate broom heads and handles have been made. This is desirable to the consumer for reasons that a consumer may need only replacement of a worn broom head or a broken handle.

Nevertheless, the art of making conventional wooden handle brooms with sewn broom corn fibers wound to the handle has remained popular and relatively unchanged. This is due to the fact that such broom making equipment is relatively simple and provides a consumer with an inexpensive product. In making such brooms, broom corn fibers are placed adjacent an end of the handle to become the broom head and a piece of winding is tacked through the broom corn fibers or grass to the wooden handle end. A clockwise rotatable collet attaches to another end of the wooden handle and the handle is rotated to draw the winding about the broom corn fibers in a manner to secure the broom corn fibers to the handle wherein a terminal end of the winding is stapled or tacked to the wooden handle.

There is a desire and need to continue making this type of broom yet have a separate broom head and handle, and, for the reasons stated, employ the described conventional broom making equipment to accomplish the same. Additionally, it is desired that broom handles be made from other materials, such as metal or plastic, and integrated into the conventional broom making process. Presently, no such methods or devices are available to satisfactorily accomplish this.

BRIEF SUMMARY OF THE INVENTION

It is an object to improve brooms.

It is another object to improve broom manufacturing.

It is an object to solve the need described above by providing a broom corn type broom with a separable head and handle.

Accordingly, one embodiment is directed to a broom corn fiber type broom, which includes a broom head having a generally cylindrical plastic sleeve having a first end which defines an open surface extending axially therethrough and a second end which has defined partially axially extending therethrough a forward threaded open surface in communication with the open surface of the first end and further defines an open keyed surface of a predetermined configuration axially extending from the forward threaded open surface through a remainder of the second end. A plurality of broom fibers are disposed adjacent an outer surface of the sleeve and means are connected to the sleeve for binding the broom corn fibers to the sleeve. A handle having an outer diameter less than a diameter of the open surface of the first end of the sleeve and having an end having an outer diameter less than a diameter of the threaded surface of the second end of the sleeve and threaded in a complimentary manner to be received therein is threadably connected to the broom head. The broom further includes a flange extending from the second end.

Another embodiment is directed to a method for forming a broom head. The method includes the steps of (a) press-fitting a sleeve having a first end an open surface axially extending therethrough and a second end including an open keyed surface to a shaft having an external keyed end of a size and configuration to be complimentary press-fit received within the keyed surface, (b) placing broom corn fibers adjacent an outer surface of the sleeve, (c) winding a wire about the broom corn fibers in a manner to bind the broom corn fibers to the sleeve in a manner to form a broom head and (d) removing said broom head from the shaft.

Other objects and advantages will be readily apparent to those skilled in the art upon viewing the drawings and reading the detailed description hereafter.

BRIEF DESCRIPTION OF THE DRAWINGS

FIG. 8 shows winding about broom corn fibers having been attached to the sleeve to form a broom head.

FIG. 9 shows a cross section of the sleeve, shaft and stud at line 9—9 in FIG. 8.

FIG. 10 shows a wooden handle inserted into the broom head depicted in FIG. 8 to form a broom.

FIG. 14 shows a cross section of the sleeve at line 14—14 in FIG. 12.

FIG. 15 shows a broom head formed about the sleeve in FIG. 11.

FIG. 16 shows a cross section of the sleeve in FIG. 11.

FIG. 17 shows a broom handle.

DETAILED DESCRIPTION OF THE INVENTION

Figure 1:
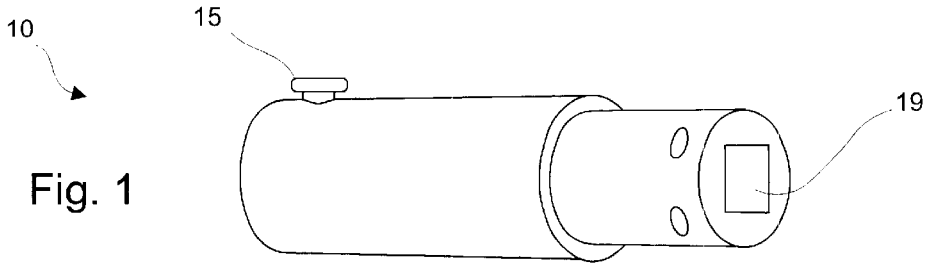
FIG. 1 shows a perspective view of a broom sleeve of the present invention.
Figure 2:
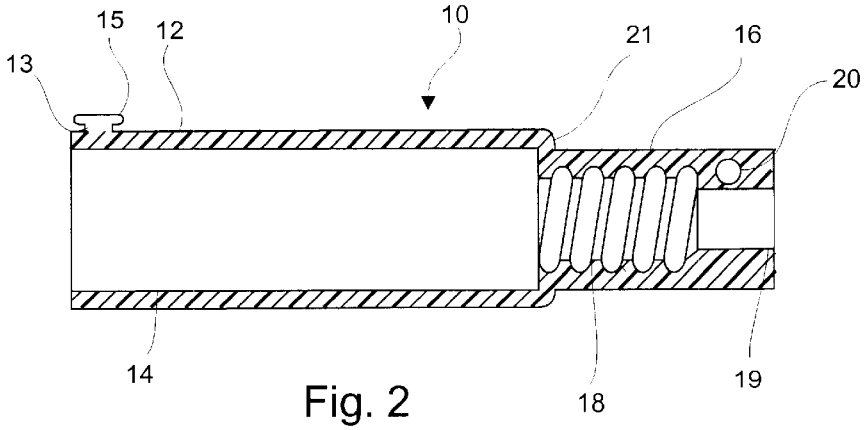
FIG. 2 shows a cross section of the broom sleeve of FIG. 1.
Figure 3:
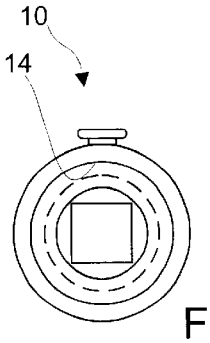
FIG. 3 shows an end view of the broom sleeve of FIG. 1.
Figure 4:
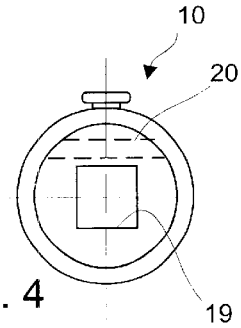
FIG. 4 shows another end view of the broom sleeve of FIG. 1.
Figure 5:
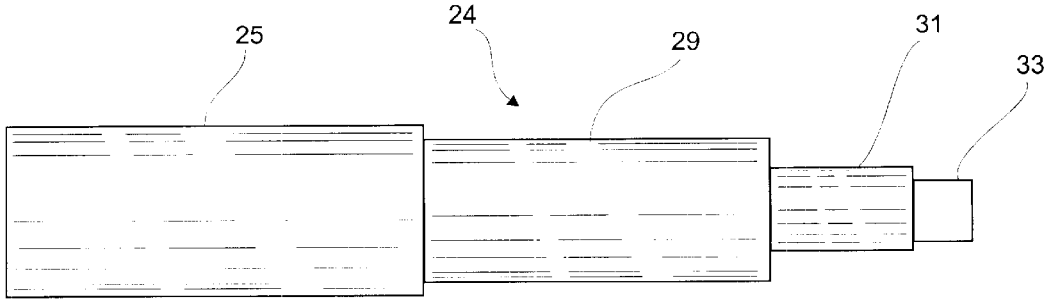
FIG. 5 shows a shaft for use in the method of the present invention.
Figure 11:
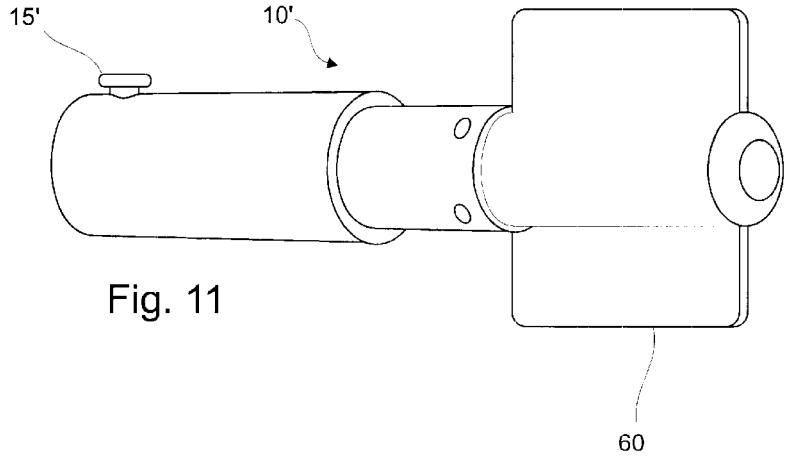
FIG. 11 shows a perspective view of another embodiment of a broom sleeve.

Referring to the drawings, the present invention includes a generally cylindrical sleeve 10 for use in a novel method of making a broom corn type. As seen in FIGS. 1 and 11, the sleeve 10 and 10' are preferably made of material, such as moldable plastic. The sleeve 10 has a first end 12 which defines an open surface 14 extending axially therethrough and a second end 16 which defines a forward threaded open surface 18 partially extending axially through the sleeve 10 which is in communication with the open surface 14 of the first end 12.

The sleeve 10 also defines an open keyed surface 19 of a predetermined configuration, here shown to be rectangular, extending axially through a remainder of the second end 16 and in communication with the forward threaded open surface 18. The keyed surface 19 is for use with a shaft 24 described hereinafter.

The first end 12 has integrally formed on an outer surface thereof a stud 13 having a head 15 to retain the wire 40 as described below. The second end 16 has a bored surface 20 extending radially through it. The outer diameter of the first end 12 is slightly larger than the outer diameter of the intermediate portion 16, thus forming a shoulder 21 therebetween.

Figure 6:
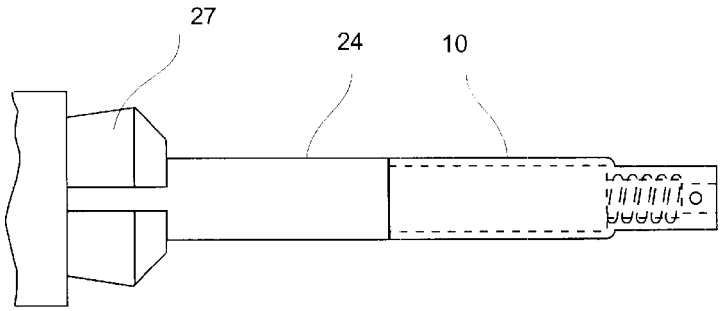
FIG. 6 shows the sleeve of FIG. 1 disposed on the shaft of FIG. 5.

The shaft 24 is made of any suitable material, such as metal or plastic, in order to carry out the invention. The shaft 24 has an end 25 which is fixably connectable to a motorized rotatable collet 27, as seen in FIG. 6, wherein the collet 27 is connectable to a power source (not shown) to enable the shaft 24 to be conventionally clockwise rotated.

The shaft 24 has a portion 29 axially extending from the end 25 and has an outer diameter slightly less than a diameter of the open surface 14 and is of a length slightly longer than the first end 12 of the sleeve 10. The shaft 24 has another portion 31 having an outer diameter slightly less than a smallest diameter of the forward threaded open surface 18 and is of a length approximately equal thereto. The shaft 24 has a keyed pad end 33 of a complimentary rectangular size and configuration to be press-fit received within the open keyed surface 19, as seen in FIG. 6. It is noted that other suitable geometric keyed configurations may be employed without departing from the invention and the same should be included as within the scope of the claims appended hereto.

An end 26 of a broom handle 28, as seen in FIG. 10, is of a size and configuration to be threadedly received in the open surface 14 and 18. The end 26 has a forward threaded surface 32 to thread to the threaded surface 18.

In carrying out the invention, the sleeve 10 is slidably connected to the shaft 24 such that the keyed end 33 is disposed within the open keyed surface 19. The shaft 24 is connected to the collet 27. The collet 27 is commonly geared to rotate clockwise and the keyed end 33 drives the sleeve 10 in a clockwise direction during the winding process.

Figure 7:
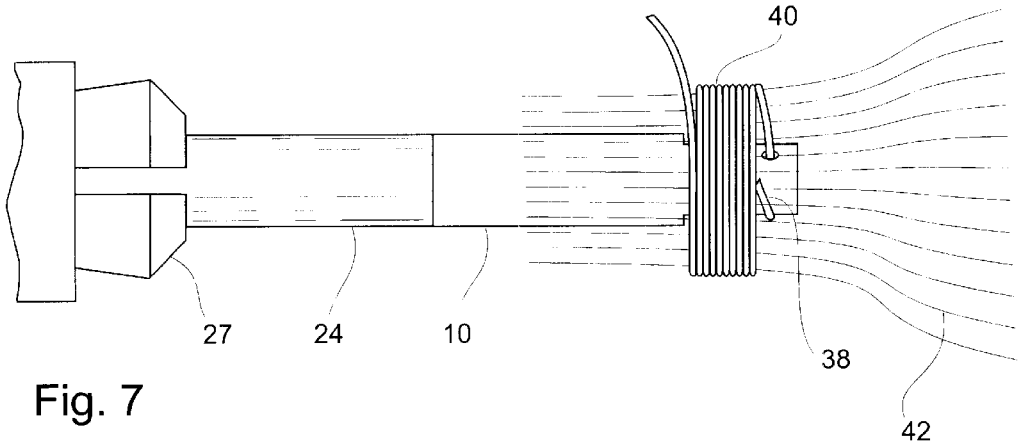
FIG. 7 shows winding about broom corn fibers being attached to the sleeve.

As seen in FIG. 7, an end 38 of winding wire 40 is passed through the bored surface 20 and tied off to secure the end 38 to the sleeve 10. Broom corn fibers 42 are placed adjacent the sleeve 10. While holding the wire 40 in a feeding manner, the collet 27 is powered to cause the rotation of the sleeve 10 in a clockwise direction. The keyed shaft 24 is prevented from backing out of or off of the sleeve 10 during the winding process as described above. As the sleeve 10 rotates, the wire 40 wraps about the broom corn 42 to tightly bind the same to the second end 16. The initial winding proceeds up to the shoulder 21 whereat a portion of the broom corn 44, as seen in FIG. 10, is left unbound. The winding continues about the remainder of the broom corn 42 and first end 12 of the sleeve 10 to a terminal point 46 of the sleeve 10. At this point, the rotation of the collet 27 and in turn the sleeve is stopped.

The integrally formed stud 13 positioned adjacent the terminal point is wrapped with a piece 50 of the wire 40 and tied off. The head 15 prevents the wire 40 from sliding off the stud 13. Any remainder of the wire 40 beyond piece 50 can be cut off. At this point, the newly formed broom head 56 is forcibly removed from the shaft 24 and is threaded to the handle 28 to form a broom 58 contemplated by the present invention.

Figure 12:
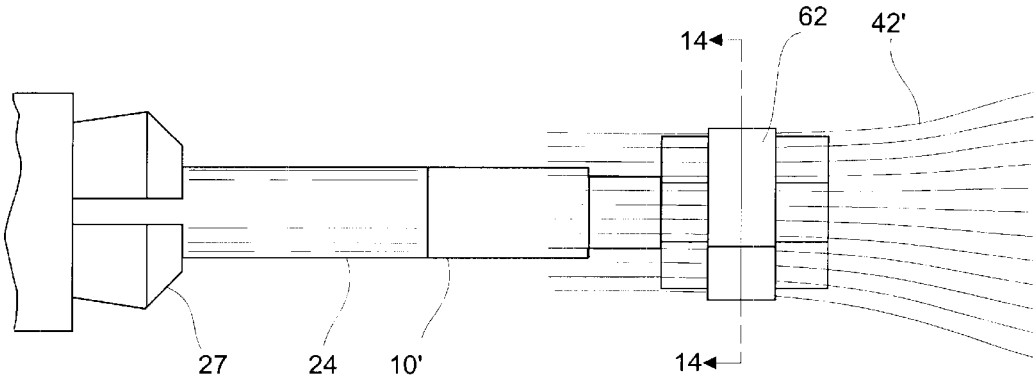
FIG. 12 shows banding about broom corn fibers being attached to the sleeve of FIG. 11.
Figure 13:
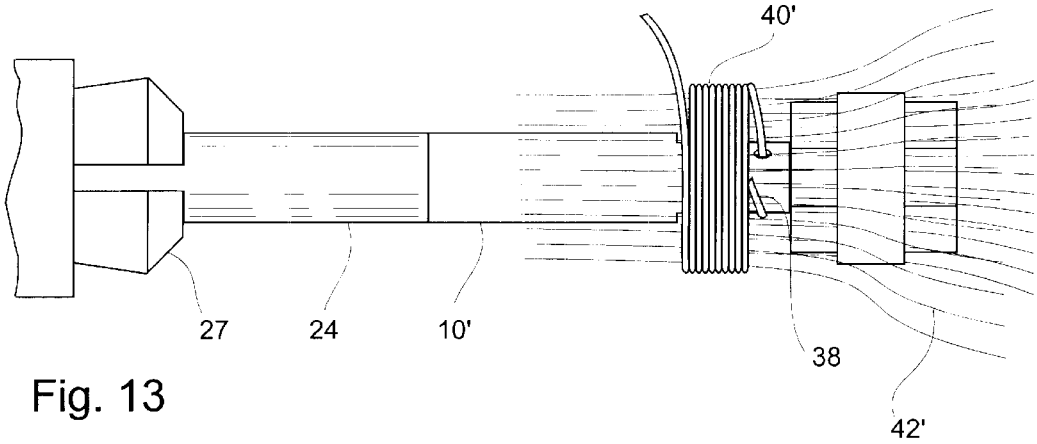
FIG. 13 shows winding about broom corn fibers having been attached to the sleeve of FIG. 11 to form a broom head.

Another embodiment of the invention is shown in FIGS. 12–14 which is well suited for making larger broom heads. Herein the sleeve 10' is of a similar structure previously described with inclusion of a pair of radially extending flanges 60 which are disposed at about 180 degrees from one another. The flanges 60 are generally rectangular and serve the purpose of providing additional surface area to which the broom corn 42' can be connected.

In this regard, a portion of the broom corn 42' is disposed adjacent the flanges and a band 62 is wrapped around an end 16'. A fastener 64, such as a nail, is then driven through the band 62, broom corn 42' and flanges 60 to partially hold the broom corn 42 in place. With the device 10' operably disposed on the shaft 42, additional broom corn 42' is placed adjacent the band 62 and held in place. Using a wire 40', the broom corn 42' is secured to the device 10' in a similar manner as described above for form head 56'.

The above described embodiments are set forth by way of example and are not for the purpose of limiting the present invention. It will be readily apparent to those skilled in the art that obvious modifications and variations can be made to the embodiment without departing from the scope of the invention. Accordingly, the claims appended hereto should be read in their full scope including any such modifications and variations.

What is claimed is:

1. A broom corn fiber type broom, which includes:

a broom head having a generally cylindrical plastic sleeve having a first end which defines an open surface extending axially therethrough and a second end which has defined partially axially extending therethrough a forward threaded open surface in communication with said open surface of said first end and further defines an open keyed surface of a predetermined configuration axially extending from said forward threaded open surface through a remainder of said second end, a plurality of broom fibers disposed adjacent an outer surface of said sleeve, and means connected to said sleeve for binding said broom corn fibers to said sleeve; and a handle having an outer diameter less than a diameter of said open surface of said first end of said sleeve and having an end having an outer diameter less than a diameter of said threaded surface of said second end of said sleeve and threaded in a complimentary manner to be received therein, and wherein said handle is threadably connected to said broom head.

2. The broom of claim 1, wherein said binding means includes a radially extending bored surface through said second end of said sleeve, a wire having an end passing through said bored surface into and out of said open surface of said second end and tied to another portion of said wire, another portion of said wire wound about said broom corn fibers, and another end portion of said wire tied to an integrally formed stud which extends from said first end of said sleeve.

3. The broom of claim 1, wherein said first end of said handle has an outer diameter greater than an outer diameter of said second end forming a shoulder therebetween.

4. The broom of claim 1, wherein said keyed surface is of a rectangular shape.

5. The broom of claim 1, which further includes a flange extending from said second end.

6. The broom of claim 1, which further includes a pair flanges radially extending from said second end at about 180 degrees from one another.

7. A broom head for connection to a broom corn fiber type broom handle, wherein the handle includes an end having a threaded surface, which includes:

a generally cylindrical plastic sleeve having a first end which defines an open surface extending axially therethrough and a second end which has defined partially axially extending therethrough a forward threaded open surface in communication with said open surface of said first end and further defines an open keyed surface of a predetermined configuration axially extending from said forward threaded open surface through a remainder of said second end wherein said forward threaded open surface is threadably connectable to the threaded end of the broom handle; and a plurality of broom fibers disposed adjacent an outer surface of said sleeve; and means connected to said sleeve for binding said broom corn fibers to said sleeve.

8. The broom of claim 7, wherein said binding means include a wire having an end passing about said broom corn fibers and tied to another portion of said wire to partially bind said broom corn fibers to said sleeve, and another end of said wire tied to an integrally formed stud which extends from said first end of said sleeve to completely bind said broom corn fibers to said sleeve.

9. A broom head for connection to a broom corn fiber type broom handle, wherein the handle includes an end having a threaded surface, which includes:

a broom head having a plastic sleeve with a first end which defines an open surface extending axially therethrough and a second end which defines axially therethrough a forward threaded open keyed surface in communication with the open surface of the first end, a plurality of broom corn fibers having a portion thereof laterally extending along an outer surface of said sleeve; and means connected to said sleeve for binding said portion of said broom corn fibers to said sleeve.

10. The broom head of claim 9, wherein said binding means include a wire having an end passing about said broom corn fibers and said second end to partially bind said broom corn fibers to said sleeve, and another end of said wire tied to an integrally formed stud which extends from said first end of said sleeve to completely bind said broom corn fibers to said sleeve.

*11. A plastic sleeve for use in connecting a plurality of cleaning fibers thereto with the aid of a rotatable shaft having a keyed end to form a head suitable for use with a broom which is connected to a handle having a threaded end, wherein said sleeve includes:*

*a generally cylindrical plastic sleeve member having a first end which defines an open surface extending axially therethrough and a second end which has a forward threaded open surface defined partially axially extending therethrough in communication with said open surface of said first end and which is threaded in a complementary manner to receive therein the threaded handle end and further defines an open keyed surface of a predetermined configuration axially extending from said forward threaded open surface through a remainder of said second end which is complementary configured to receive the keyed end of the shaft, and an outer surface of said sleeve against which said fibers may be disposed to form said head when connected thereto.*

*12. The sleeve of claim 11, which further includes an integrally formed stud which extends from said sleeve to which a wire is connected to aid in connecting said fibers to said sleeve.*

*13. The sleeve of claim 11, wherein said keyed surface is of a rectangular shape.*

*14. The sleeve of claim 11, which further includes a flange extending from said second end.*

*15. The sleeve of claim 14, which further includes a pair flanges radially extending from said second end at about 180 degrees from one another.*

*16. A handle having a head suitable for use with a broom, which includes:*

*a head having a generally cylindrical plastic sleeve having a first end which defines an open surface extending axially therethrough and a second end which has defined partially axially extending therethrough a forward threaded open surface in communication with said open surface of said first end and further defines an open keyed surface of a predetermined configuration axially extending from said forward threaded open surface through a remainder of said second end, a plurality of cleaning fibers disposed adjacent an outer surface of said sleeve, and means connected to said sleeve for binding said fibers to said sleeve; and*

*a handle having an outer diameter less than a diameter of said open surface of said first end of said sleeve and having an end having an outer diameter less than a diameter of said threaded surface of said second end of said sleeve and threaded in a complimentary manner to be received therein, and wherein said handle is threadably connected to said head.*

*17. The handle having a head of claim 16, wherein said binding means includes a wire having and end wound about said fibers, and another end portion of said wire tied to an integrally formed stud which extends from said first end of said sleeve.*

*18. The handle having a head of claim 16, wherein said first end of said handle has an outer diameter greater than an outer diameter of said second end forming a shoulder therebetween.*

*19. The handle having a head of claim 16, wherein said keyed surface is of a rectangular shape.*

*20. The handle having a head of claim 16, which further includes a flange extending from said second end.*

*21. The handle having a head of claim 20, which further includes a pair flanges radially extending from said second end at about 180 degrees from one another.*

*22. The handle having a head of claim 16, wherein said implement is a broom and said fibers are broom corn fibers.*

* * * * *